(12) United States Patent
Gueret et al.

(10) Patent No.: US 10,638,668 B2
(45) Date of Patent: May 5, 2020

(54) MODELING AND DECISION SUPPORT FOR HORTICULTURE

(71) Applicant: Accenture Global Solutions Limited, Dublin (IE)

(72) Inventors: Christophe Dominique Marie Gueret, Dublin (IE); Freddy Lecue, Dublin (IE); Nicholas McCarthy, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 94 days.

(21) Appl. No.: 16/117,153

(22) Filed: Aug. 30, 2018

(65) Prior Publication Data

US 2020/0068807 A1 Mar. 5, 2020

(51) Int. Cl.
| | | |
|---|---|---|
| *A01G 7/00* | (2006.01) | |
| *G06T 17/00* | (2006.01) | |
| *G06K 9/62* | (2006.01) | |
| *G06N 3/04* | (2006.01) | |

(52) U.S. Cl.
CPC .............. *A01G 7/00* (2013.01); *G06K 9/6288* (2013.01); *G06N 3/0445* (2013.01); *G06T 17/00* (2013.01)

(58) Field of Classification Search
CPC C12Q 1/6895; C12Q 2600/13; C12Q 1/6883; C12Q 1/6888
See application file for complete search history.

(56) References Cited

U.S. PATENT DOCUMENTS

| | | | | |
|---|---|---|---|---|
| 6,553,312 B2 * | 4/2003 | Upadhyaya | .......... | A01C 21/005 342/357.31 |
| 7,084,323 B1 * | 8/2006 | Sheen | .................. | C12N 9/1205 435/252.3 |
| 7,155,056 B2 * | 12/2006 | Andersen | .................. | G06T 7/11 382/164 |
| 7,528,232 B2 * | 5/2009 | Wagner | ................ | C07K 14/415 530/350 |
| 8,252,552 B2 * | 8/2012 | Mirkov | ................ | C07K 14/415 435/69.1 |

(Continued)

OTHER PUBLICATIONS

EP Search Report in European Application No. EP 19187784, dated Feb. 11, 2020, 8 pages.

*Primary Examiner* — Yosef Kassa
(74) *Attorney, Agent, or Firm* — Fish & Richardson P.C.

(57) ABSTRACT

Implementations include providing a baseline multi-dimensional model of a cultivar, determining an encoding based on the baseline multi-dimensional model, and a target multi-dimensional model, the encoding defining a string of symbols, and being based on an alphabet and a set of rules, providing an expected multi-dimensional model based on the encoding, and a modified set of rules, the modified set of rules being based on the set of rules, the expected multi-dimensional model representing the cultivar after a period of time, selecting a set of actions by determining multiple predicted multi-dimensional models for each set of actions in a plurality of sets of actions, and, for each predicted multi-dimensional model, providing a predicted yield that can be used to determine impact with respect an expected yield, the set of actions being selected based on a respective impact, and providing the set of actions as output for executing on the cultivar.

36 Claims, 5 Drawing Sheets

(56) References Cited

U.S. PATENT DOCUMENTS

| | | | | |
|---|---|---|---|---|
| 8,341,880 B2* | 1/2013 | Lejeune | ............... | A01G 9/00 47/58.1 R |
| 8,869,447 B2* | 10/2014 | Benfey | ............... | A01G 7/00 47/60 |
| 2014/0358486 A1 | 12/2014 | Osborne et al. | | |
| 2017/0061050 A1 | 3/2017 | Mewes et al. | | |
| 2018/0164762 A1 | 6/2018 | Mewes et al. | | |

* cited by examiner

MODELING AND DECISION SUPPORT FOR HORTICULTURE

BACKGROUND

Horticulture can generally be described as the science and art of growing plants. Examples can include fruits, vegetables, flowers, and any other cultivar (e.g., plants, trees, vines). In commercial operations, horticulture can play a significant role in yearly crop yields, and quality. Pruning is a horticulture activity that can effect yields, and quality. During growth, cultivar can be selectively pruned in an effort to improve the eventual yield, and quality of the resulting crops. For example, pruning can be conducted in a manner, such that cultivar growth avoids interference with a machine that may be later used to harvest. As another example, pruning may be conducted to avoid consumption of nutrients, and resources in less promising portions of the cultivar (e.g., areas likely to yield little) to improve eventual yield, and/or quality. To be effective, however, pruning is a knowledge, and resource-intensive task.

SUMMARY

Implementations of the present disclosure are generally directed to modeling and decision support for horticulture. More particularly, implementations of the present disclosure are directed to a horticulture support platform that provides activities to improve crop yields.

In some implementations, actions include providing a baseline multi-dimensional data model of a cultivar, the cultivar growing over time, determining an encoding based on the baseline multi-dimensional data model, and a target multi-dimensional model, the encoding defining a string of symbols, and being based on an alphabet and a set of rules, providing an expected multi-dimensional model based on the encoding, and a modified set of rules, the modified set of rules being based on the set of rules, the expected multi-dimensional model representing the cultivar after a period of time, selecting a set of actions by determining multiple predicted multi-dimensional models for each set of actions in a plurality of sets of actions, and, for each predicted multi-dimensional model, providing a predicted yield that can be used to determine impact with respect an expected yield, the set of actions being selected based on a respective impact, and providing the set of actions as output for executing one or more actions of the set of actions on the cultivar. Other implementations of this aspect include corresponding systems, apparatus, and computer programs, configured to perform the actions of the methods, encoded on computer storage devices.

These and other implementations can each optionally include one or more of the following features: actions further include receiving image data representative of stereoscopic images of the cultivar, the baseline multi-dimensional data model being generated at least partially from the stereoscopic images; the alphabet and set of rules are provided as part of an L-system for providing strings to represent the cultivar; the modified set of rules is provided by adjusting a probability of at least one symbol of at least one rule based on the context data; the target multi-dimensional model is selected from a plurality of generated target multi-dimensional models based on respective similarity scores, each similarity score representing a degree of similarity between the baseline multi-dimensional model, and a respective target multi-dimensional model; the plurality of target multi-dimensional models are generated based on one of a recurrent neural network (RNN) approach, and an estimation of distribution algorithm (EDA) approach; the set of actions is output by displaying the cultivar on a display, and providing one or more treatments, each treatment representing an action in the set of actions; at least one action in the set of actions includes pruning a feature of the cultivar; the feature includes one or more of a leaf and a branch; each rule in the set of rules provides two or more expansion symbols for replacing symbols in previous iterations of the string of symbols; actions further include receiving environmental sensor data, wherein the expected multi-dimensional model is provided based on the received environmental sensor data; and each predicted multi-dimensional model is determined based on a set of actions applied to the expected multi-dimensional model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to modeling and decision support for horticulture. More particularly, implementations of the present disclosure are directed to a horticulture support platform that provides activities to improve crop yields. In some implementations, actions include providing a baseline multi-dimensional data model of a cultivar, the cultivar growing over time, determining an encoding based on the baseline multi-dimensional data model, and a target multi-dimensional model, the encoding defining a string of symbols, and being based on an alphabet and a set of rules, providing an expected multi-dimensional model based on the encoding, and a modified set of rules, the modified set of rules being based on the set of rules, the expected multi-dimensional model representing the cultivar after a period of time, selecting a set of actions by determining multiple predicted multi-dimensional models for each set of actions in a plurality of sets of actions, and, for each predicted multi-dimensional model, providing a predicted yield that can be used to determine impact with respect an expected yield, the set of actions being selected based on a respective impact, and providing the set of actions as output for executing one or more actions of the set of actions on the cultivar.

Figure 1:
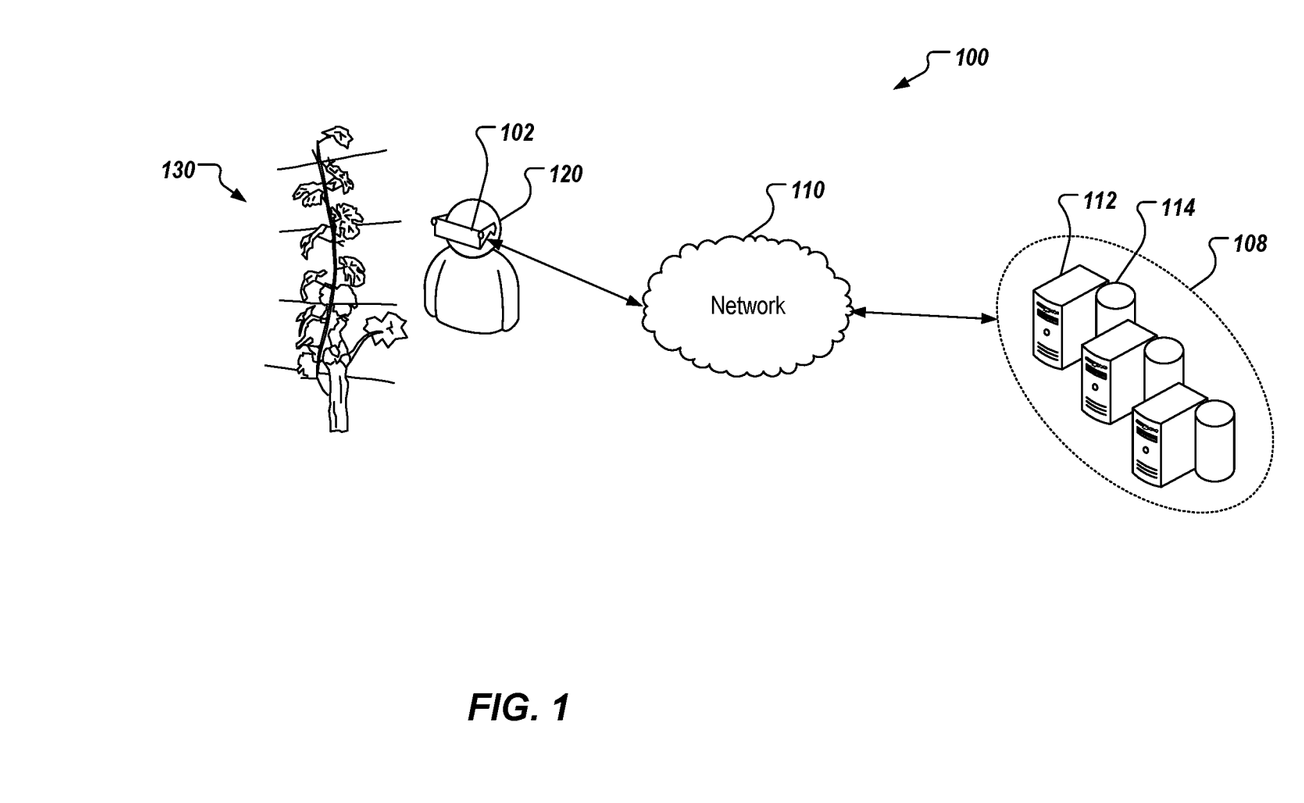
FIG. 1 depicts an example system that can execute implementations of the present disclosure.

FIG. 1 depicts an example system 100 that can execute implementations of the present disclosure. The example system 100 includes a computing device 102, a back-end system 108, and a network 110. In some examples, the network 110 includes a local area network (LAN), wide area network (WAN), the Internet, or a combination thereof, and connects web sites, devices (e.g., the computing device 102), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a computer-implemented service for a knowledge graph platform for linking entities in dynamic knowledge graphs in accordance with implementations of the present disclosure.

In some examples, the computing device 102 can include any appropriate type of computing device such as a wearable computing device, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 is provided as a wearable computing device. In some examples, the wearable computing device can communicate with the back-end system 108 through the network 110. In some examples, the wearable computing device communicates with a second computing device (e.g., cellular telephone), which enables communication to the back-end system 108 through the network 110.

In some implementations, the back-end system 108 hosts a horticulture support platform in accordance with implementations of the present disclosure. More particularly, and as described herein, a user 120 can use the computing device 102 to collect data on cultivar. Example cultivar can include, without limitation, plants, trees, and vines. An example cultivar 130 is depicted in FIG. 1, and includes a grape vine. Example data can include, without limitation, images, video, location, terrain context, and terrain shape. In some implementations, the data is processed by the horticulture support platform to provide a multi-dimensional model of the cultivar, and determine an encoding of the cultivar based on the multi-dimensional model. In some implementations, the encoding is processed to predict future growth of the cultivar, and one or more actions are recommended for acting on the cultivar. Example actions can include identifying portions, and locations of the cultivar for pruning.

Implementations of the present disclosure are described in further detail herein with reference to an example cultivar. The example cultivar includes grape vines, and, in particular, grape vines of a vineyard (e.g., the grape vine 130 of FIG. 1). It is contemplated, however, that implementations of the present disclosure can be realized with any appropriate cultivar.

Figure 2:
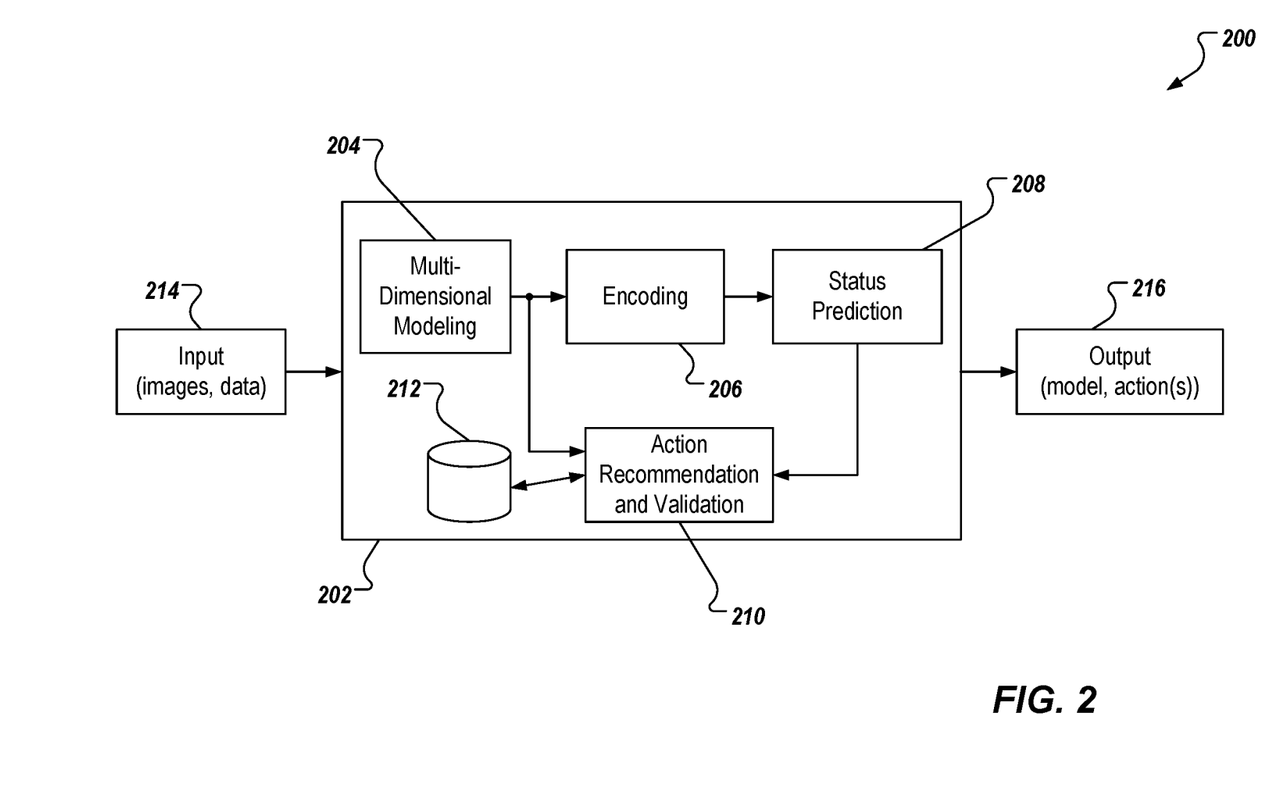
FIG. 2 depicts an example module architecture in accordance with implementations of the present disclosure.

FIG. 2 depicts an example module architecture 200 in accordance with implementations of the present disclosure. In the depicted example, the example module architecture 200 includes an example horticulture support platform 202 that includes a multi-dimension modeling module 204, an encoding module 206, a status prediction module 208, an action recommendation and validation module 210, and an action database 212. As described in further detail herein, the horticulture support platform 202 receives input 214, and process the input to provide output 216. In some examples, and as described in further detail herein, the input includes data associated with a cultivar (e.g., images, video, location, terrain context, and terrain shape). In some examples, the data is provided from a computing device (e.g., the computing device 102 of FIG. 1). In some examples, and as described in further detail herein, the output 216 can include one or more actions, and a multi-dimensional model of the cultivar.

As introduced above, pruning can play a significant role in yearly crop yields, and quality. Pruning is a horticulture activity that can effect yields, and quality. During growth, cultivar can be selectively pruned in an effort to improve the eventual yield, and quality of the resulting crops. For example, pruning can be conducted in a manner to avoid interference with a machine that may be later used to harvest. As another example, pruning may be conducted to avoid consumption of nutrients, and resources in less promising areas of a cultivar (e.g., branches likely to yield little). To be effective, however, pruning is a knowledge, and resource-intensive task.

In view of the foregoing, the horticulture support platform of the present disclosure leverages technology, and multi-dimensional modeling to provide one or more actions for a cultivar. In some examples, the one or more actions are performed on the cultivar to improve yield, and/or quality of a resulting crop. In further detail, a user (e.g., the user 120 of FIG. 1) can use a computing device (e.g., the computing device 102) to collect data on a cultivar (e.g., the cultivar 130). Example data can include, without limitation, images, video, location, terrain context, and terrain shape.

In some examples, images and/or video of the cultivar can be captured using a camera. For example, the computing device can include one or more cameras that can capture digital images, and/or video of the cultivar. In some examples, the computing device includes multiple cameras that enable stereoscopic images of the cultivar to be generated.

In some examples, a location of the cultivar can be determined based on a location of the computing device. For example, one or more signals associated with the computing device can be used to determine a geographic location of the computing device, and associate the location to the cultivar. Example signals can include, without limitation, global positioning system (GPS) signals, cellular signals (e.g., location triangulation based on cellular telephone signals), and wireless connectivity signals (e.g., wireless connection to one or more wifi routers). In some examples, a location of a cultivar can be determined based on a tag associated with the cultivar. In some examples, the tag can be affixed on or near the cultivar, and can record information associated with the cultivar (e.g., geographic coordinates). In some examples, the information can be encoded on the tag as a machine-readable code (e.g., bar code, QR code). For example, the computing device can include a machine-readable code scanner that can be used to scan the code, and discern the location.

In some examples, the terrain context, and/or the terrain shape can be determined based on the particular cultivar, and/or the location of the cultivar. In some examples, the location of the cultivar can be used to index a terrain database, which can provide the terrain context, and/or terrain shape of the particular location. In some examples, the terrain context, and/or terrain shape can be determined based on a tag associated with the cultivar. For example, and as described above with reference to location, the tag can be affixed on or near the cultivar, and can record information associated with the cultivar (e.g., terrain context, terrain shape). In some examples, the information can be encoded on the tag as a machine-readable code (e.g., bar code, QR code). For example, the computing device can include a machine-readable code scanner that can be used to scan the code, and discern the terrain context, and/or terrain shape.

In some examples, terrain context can include, without limitation, one or more environmental features. Example environmental features can include, without limitation, types of minerals in the ground, sparsity/density of minerals, direction of sunlight, duration of sunlight, and average rainfall. In some examples, terrain shape can include, without limitation, topography of the location. For example, the terrain shape can indicate whether the cultivar is on a slope, and if so, the degree of slope, and/or location along the slope (e.g., a cultivar higher up on a steep slope may have less water available than a cultivar at a bottom of the slope).

Figure 3A:
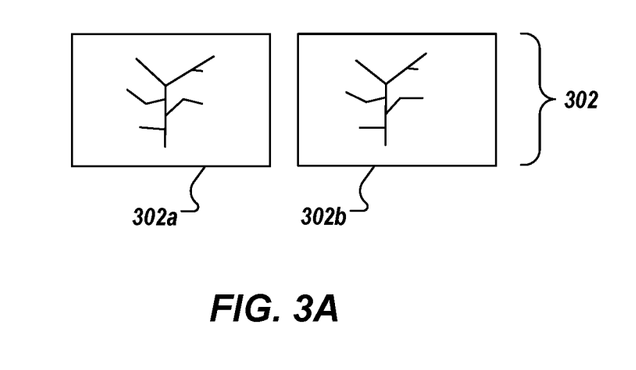
FIG. 3A depicts example stereoscopic images of an example cultivar over time.

In accordance with implementations of the present disclosure, the data is processed by the horticulture support platform to provide a multi-dimensional model of the cultivar. In some examples, the multi-dimensional model is provided as a three-dimensional (3D) model of the cultivar. In some implementations, the multi-dimensional model is provided based on stereoscopic images of the cultivar. FIG. 3A depicts example stereoscopic images of an example cultivar over time. In the example of FIG. 3A, an image set 302 is provided, and includes images 302a, 302b. For example, image 302a can be a left-side image, and image 302b can be a right-side image of a cultivar. In some examples, the image set 302 is provided at a time (e.g., as the user 120 is viewing the cultivar 130), and is stored in computer-readable memory.

In some implementations, the image data is processed, and segmented to provide the multi-dimensional model as a skeletal model. For example, the multi-dimensional modeling module 204 of FIG. 2 can process the image data to provide the multi-dimensional model. In some examples, the image data is processed to provide respective clouds of data points. For example, and with reference to FIG. 3A, the image 302a can be processed to provide a first cloud of data points, and the image 302b can be processed to provide a second cloud of data points. In some examples, data points are clustered across the clouds of data points to determine overlap between data points between the clouds. That is, the data points that are the same between clusters are determined. In some examples, a skeleton model is determined from clusters. Although an example routine for providing a multi-dimensional model from image data is provided herein, it is contemplated that implementations of the present disclosure can be realized using an appropriate routine for providing a multi-dimensional model from image data.

In some implementations, the skeleton is mapped to one or more multi-dimensional models stored in a database of multi-dimensional models to identify a relevant multi-dimensional model.

Figure 3B:
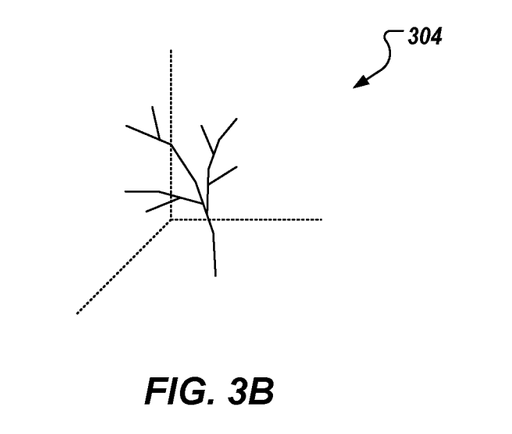
FIG. 3B depicts an example multi-dimensional model.

FIG. 3B graphically depicts an example multi-dimensional model 304 that can be provided from the image data, as described herein.

In accordance with implementations of the present disclosure, an encoding of the cultivar is determined based on the multi-dimensional model. For example, the encoding module 206 of FIG. 2 determines the encoding based on the multi-dimensional model. In some implementations, a growth modeling system is used to model growth of the cultivar to determine the encoding. An example growth modeling system includes, without limitation, a Lindenmayer system (L-system). The L-system can be described as a parallel rewriting system, and a type of formal grammar. In some examples, the L-system includes an alphabet, which includes a plurality of symbols that can be used to make strings (encodings), and a set of rules that can be applied to each symbol in a string to provide a larger string of symbols. In some examples, an initial string ("axiom") is provided, from which iterations of growth modeling begin. In some examples, the L-system includes a mechanism for translating the generated strings into geometric structures.

In further detail, the L-system can be provided as a tuple G=(V, ω, P), where: V is a set of symbols (alphabet) that includes both elements that can be replaced (variables), and elements that cannot be replaced (constants); w is the initial string of symbols from V, and defines the initial state of the L-system; and P is the set of rules that define the way variables can be replaced with combinations of constants, and other variables. In some examples, at each iteration, each rule operates on a predecessor string to provide a successor string. The rules are applied iteratively starting from the initial string to provide successor strings. In some examples, as many rules as possible are applied simultaneously, per iteration.

In some implementations, the alphabet of symbols, and the set of rules are selected for the particular cultivar. For example, multiple alphabets, and multiple sets of rules can be provided in a library, each alphabet and set of rules pair corresponding to a respective cultivar. In the instant example, an alphabet and set of rules can be selected for grape vines, generally, or for the particular type of grape vine (e.g., a particular species of *Vitis*). In some examples, the selected alphabet, and set of rules, as well as the multi-dimensional model, and a stopping criteria are processed to determine the encoding, as described in further detail herein.

In some implementations, the encoding that is to be determined for the multi-dimensional model is provided as the L-system string that represents the multi-dimensional model. In some implementations, a string is provided based on the alphabet, and one or more rules of the set of rules are applied to iteratively grow the string. In this manner, beginning with an initial string, multiple, subsequent strings can be provided, one string for each iteration. In some examples, each string can be provided to a rendering engine (not shown), which renders a target multi-dimensional model based on the provided string. That is, for each iteration, a target multi-dimensional model is provided based on the string produced by the iteration.

In some implementations, each target multi-dimensional model is compared to the multi-dimensional model provided form the image data, which can also be referred to as a baseline multi-dimensional model. In some implementations, if the comparison indicates that the stopping criteria has been achieved, it is determined that the target multi-dimensional model is sufficiently similar to the baseline multi-dimensional model. Consequently, the string that resulted in the target multi-dimensional model is provided as the encoding for the baseline multi-dimensional model. In some examples, the stopping criteria is provided as a degree of overlap (e.g., percentage of overlap, or similarity) between a target multi-dimensional model, and the baseline multi-dimensional model, which can be provided as one or more similarity scores, described in further detail herein. An example stopping criteria can include 98% overlap (similarity). In some examples, an example stopping criteria can include a threshold number of iterations. That is, if a target multi-dimensional model is not sufficiently similar to the baseline multi-dimensional model, iterations continue to be executed until a threshold number of iterations is achieved. If the threshold number of iterations is achieved, it can be determined to start the process over. That is, it can be determined that the process has failed to produce a sufficiently similar model, and the process is restarted with an initial string.

Implementations of the present disclosure are described in further detail below with reference example approaches for determining the encoding for the baseline multi-dimensional model. A first approach implements a recurrent neural network (RNN), and can be referred to as the RNN approach. A second approach implements an estimation of distribution (EDA) algorithm, and can be referred to as the EDA approach. Both approaches are described in detail herein with reference to an example alphabet, and set of rules, which can be provided as:

TABLE 1

Example Alphabet and Rules

| Symbol | Rules |
|---|---|
| S | aRb \| aR \| Rb |
| R | RR \| aR \| Rb \| L \| RL |
| L | cLc \| cL \| Lc \| T |
| T | dTd \| E |

In some examples, each symbol is representative of a feature of the cultivar. For example, a symbol can represent a bud, a twig, a branch, a leaf, or a crop (e.g., fruit, vegetable, nut). In the example of Table 1, for each symbol, a plurality of replacement symbols are provided. For example, if an S is provided in a string, during a next iteration, the S is replaced by either aRb, aR, or Rb. In some examples, the each symbol that can replace S is associated with a respective probability, and the particular symbol is selected based on the probability at each iteration. That is, for example, if a string is provided as aRb after a first iteration, the symbol R can be replaced by aR at a second iteration to evolve the string to aaRb. At a third iteration, the symbol R can be replaced by RL, as opposed to aR used in the second iteration, to evolve the string to aaRLb.

In some implementations, in the RNN approach, an initial string (e.g., S), the example alphabet, and the set of rules are provided as input to a RNN. In a first iteration, the rules are applied to expand the initial string. For example, the initial string S can be expanded to a string aRb (e.g., S is replaced by aRb based on the rules). In a next iteration, the string aRb is expanded to a string aaR (e.g., R is replaced with aR based on the rules). In a next iteration, the string aaRb is expanded to a string aaRLb (e.g., R is replaced with RL based on the rules). In a next iteration, the string aaRLb is expanded to a string aaLcLcb (e.g., R is replaced by L, and L is replaced by cLc based on the rules). In some examples, iterations can continue, and a string aacTcdTdcb can be provided.

In some implementations, a target multi-dimensional model is generated (e.g., using a rendering engine) at each iteration for comparison to the baseline multi-dimensional model. In some examples, a minimum number of iterations are performed before target multi-dimensional models are generated. For example, it is unlikely that the first few iterations will result in a target multi-dimensional model that is sufficiently similar to the baseline multi-dimensional model. Consequently, target multi-dimensional models, and comparisons need not be performed for these early iterations. In some implementations, and as described above, iterations are performed until a stop criteria is met (e.g., a threshold number of iterations have been performed, a target multi-dimensional model is determined to be sufficiently similar). In the example above, it can be determined that the target multi-dimensional model that is generated based on the string aacTcdTdcb is sufficiently similar to the baseline multi-dimensional model. Consequently, the string aacTcdTdcb can be provided as the encoding for the baseline multi-dimensional model.

In some implementations, in the EDA approach, sets of target multi-dimensional models are provided over respective rounds. Rounds are performed until a target multi-dimensional model is determined to be sufficiently similar to the baseline multi-dimensional model. In some implementations, the alphabet, and a probability profile are provided as input for generating a number of initial strings. For example, the alphabet and probability profile can be used to generate 100 initial strings. In some examples, the probability profile provides a probability for each symbol of the alphabet to be included in a string. In some examples, and as described in further detail herein, the probability profile evolves with each round. In some examples, for an initial round, the probability profile can provide the same probability for all symbols in the alphabet. That is, each symbol is as likely to be included in an initial string as any other symbol. In some implementations, the initial strings are randomly generated based on the probabilities. For example, a set of initial strings for the initial iteration can include {SR, SL, R, S, RR}.

In some implementations, each initial string is expanded by applying the rules over a number of iterations. For example, the rules can be applied to each initial string over 50 iterations to provide a set of expanded strings (e.g., an expanded string for each initial string). In some examples, each expanded string is used to render a respective multi-dimensional model (e.g., using a renderer). Consequently, a set of target multi-dimensional models can be provided (e.g., 100 target multi-dimensional models, each corresponding to an initial string that had been expanded over the 50 iterations). In some examples, a similarity score is determined for each target multi-dimensional model with respect to the baseline multi-dimensional model. Determining similarity scores is described in further detail herein.

In some implementations, the target multi-dimensional models are ranked based on their respective similarity scores. In some examples, the target multi-dimensional model that is most-similar to the baseline multi-dimensional model is ranked highest, and the target multi-dimensional model that is least-similar to the baseline multi-dimensional model is ranked lowest. In some examples, if the similarity score of the highest ranked target multi-dimensional model exceeds a threshold similarity score, the expanded string that resulted in the target multi-dimensional model is selected as the encoding for the baseline multi-dimensional model. In some examples, if the similarity score of the highest ranked target multi-dimensional model does not exceed the threshold similarity score, a next round is performed.

In some implementations, in a next round, the probability profile is adjusted based on the expanded strings provided in the previous round. In some examples, probabilities for each symbol can be adjusted based on the expanded string(s) that resulted in the highest ranked target multi-dimensional model(s) (e.g., the X highest ranked model(s), where X=1, 2, 3, . . . ). For example, the expanded strings of the highest ranked 3 models can be considered. In some examples, for each symbol in the alphabet, a probability can be determined that the symbol will appear in an expanded string. For the next round, the probability profile is adjusted to provide the probabilities determined from the previous round. In some implementations, the next round begins with randomly generating a set of initial strings based on the revised probability profile, through to ranking resulting target multi-dimensional models, as described herein. As noted above, rounds continue, and the probability profile is adjusted at each round, until a target multi-dimensional model is determined to be sufficiently similar to the baseline multi-dimensional model.

Figure 4:
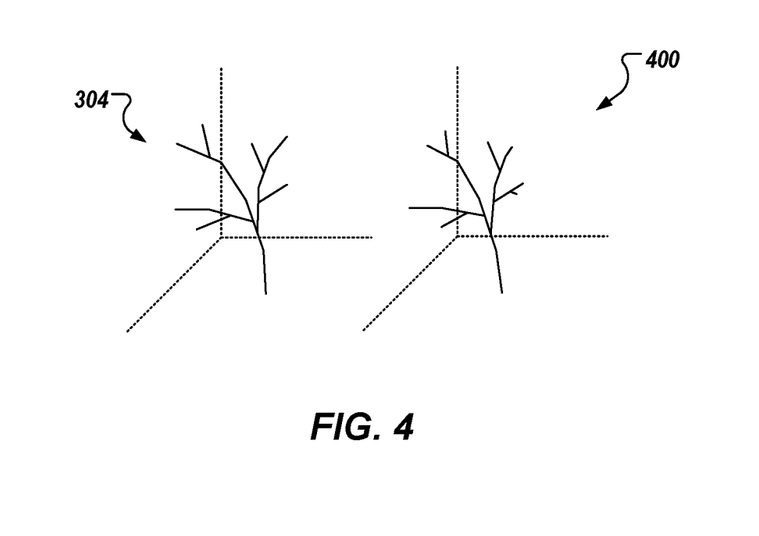
FIG. 4 depicts the example multi-dimensional model, and an example target multi-dimensional model.

FIG. 4 depicts the example baseline multi-dimensional model 304, and an example target multi-dimensional model 400. In some implementations, a similarity score can be determined, which represents a difference between the example baseline multi-dimensional model 304, and an example target multi-dimensional model 400 (e.g., the degree of overlap).

In some implementations, a first similarity score can be provided, and can be based on comparing skeletonized versions of each of the baseline multi-dimensional model, and the target multi-dimensional model. In some examples, a model is skeletonized by selecting keypoints, and providing a line between keypoints. In some examples, a keypoint can be provided as an end point of the model, and/or an intersection of lines of the model. In some implementations, a skeletonized baseline model, and a skeletonized target model are registered relative to one another. In some examples, registration can include determining a centerpoint of each of the skeletonized baseline model, and the skeletonized target model, and aligning the centerpoints in multi-dimensional space.

In some implementations, one or more of the skeletonized baseline model, and the skeletonized target model are rotated in an attempt to align respective keypoints between models. In some examples, a distance value can be determined, and rotation can continue until the distance value is minimized. In some examples, the distance value can be provided as an average distance between keypoints of the skeletonized baseline model, and respective keypoints of the skeletonized target model in multi-dimensional space. In some examples, the distance value can be provided as a total distance between keypoints of the skeletonized baseline model, and respective keypoints of the skeletonized target model in multi-dimensional space. In some examples, distance value is provided as the first similarity score.

In some implementations, a second similarity score can be provided, and can be based on comparing images of the baseline multi-dimensional model, and the target multi-dimensional model. In some implementations, two-dimensional images of each model are provided, each image corresponding to a respective plane. For example, an X-Y image, an X-Z image, and a Y-Z image can be taken for each of the baseline multi-dimensional model, and the target multi-dimensional model. In some examples, each set of corresponding images is compared, and a sub-score is determined. In some examples, the sub-scores are combined (e.g., summed, averaged, weighted-averaged) to provide the second similarity score.

In some implementations, a third similarity score can be provided, and can be based on multi-dimensional co-occurrence matrices (e.g., co-occurrence based on pixels of respective images). In some implementations, an baseline co-occurrence matrix can be provided for the baseline multi-dimensional model, and a target co-occurrence matrix can be provided for the target multi-dimensional model. In some examples, a difference between the matrices can be determined as one or more of a distance, and a Kullback-Leibler divergence (KL-divergence).

In some implementations, one or more of the first similarity score, the second similarity score, and the third similarity score are used to determine whether the target multi-dimensional model, and the baseline multi-dimensional model are sufficiently similar. For example, if the first similarity score exceeds a threshold similarity score, it can be determined that the target multi-dimensional model, and the baseline multi-dimensional model are sufficiently similar. As another example, if the second similarity score exceeds a threshold similarity score, it can be determined that the target multi-dimensional model, and the baseline multi-dimensional model are sufficiently similar. As another example, if the third similarity score exceeds a threshold similarity score, it can be determined that the target multi-dimensional model, and the baseline multi-dimensional model are sufficiently similar. In implementations where a single similarity score is used, other similarity scores need not be determined. In some implementations, two or more of the first similarity score, the second similarity score, and the third similarity score can be combined to provide the similarity score. In some examples, each of first similarity score, the second similarity score, and the third similarity score can be normalized, and combined (e.g., summed, average, weighted averaged, MIN, MAX).

As described above, if the target multi-dimensional model is determined to be sufficiently similar to the baseline multi-dimensional model, the encoding used to provide the target multi-dimensional model is used as the encoding for the baseline multi-dimensional model. If the target multi-dimensional model is determined to not be sufficiently similar to the baseline multi-dimensional model, the encoding process is started afresh, or a next iteration of encoding is performed.

In accordance with implementations of the present disclosure, the encoding determined for the baseline multi-dimensional model is processed to predict future growth of the cultivar. More particularly, a set of modified rules are applied to the encoding over a number of iterations to provide an expected encoding. In some examples, the expected encoding is rendered to provide an expected multi-dimensional model. In some examples, the expected multi-dimensional model represents the cultivar as it is expected to grow over a time represented by the number of iterations. That is, the expected multi-dimensional model represents how the cultivar is expected to be in the future, if no action(s) (e.g., pruning) were performed.

In some implementations, the set of modified rules are based on the set of rules, and the context data. For example, the set of rules can be modified based on the terrain context, and/or the terrain shape to provide the set of modified rules. In some examples, modification includes adjusting one or more probabilities of one or more rules based on the context data. For example, and as described above, the set of rules can include S:=aRb|aR|Rb, indicating that the symbol S in a string can be replaced with one of aRb, aR, or Rb (expansion symbols) in a next iteration. In some examples, each expansion symbol is associated with a respective probability indicating a likelihood that the respective expansion symbol is selected in the next iteration to expand the string. In some examples, one or more of the probabilities is increased or decreased depending on the context data.

By way of non-limiting example, the context data can indicate that the cultivar is at the higher end of a steep slope (less water), and gets a relatively small amount of sunshine during the day. This context data can indicate that the cultivar may have hindered growth relative to other cultivar. Consequently, a probability for an expansion symbol representing a feature that requires abundant water, and sunshine can be reduced, and a probability for an expansion symbol representing a feature that does not require abundant water, and/or sunshine can be increased.

In some implementations, the number of iterations for expansion of the encoding to provide the expected encoding represent a determined period of time. In some examples, the determined period of time can correspond to a harvest time. For example, a difference between a future harvest time, and a current time can be determined, and the number of iterations can be selected to represent that time. In some examples, the current time indicates a time (and/or date), at which the cultivar is being modeled.

As introduced above, the expected multi-dimensional model represents how the cultivar is expected to be in the future, if no action(s) (e.g., pruning) were performed. Accordingly, the expected multi-dimensional model can depict a baseline harvest that is expected from the cultivar (e.g., number of grapes, apples, oranges, pears, tomatoes, corn, and the like). That is, the baseline harvest represents the expected harvest from the cultivar, if no action(s) were to be taken.

In accordance with implementations of the present disclosure, and one or more actions are recommended for acting on the cultivar. In some implementations, a database of actions can be provided (e.g., the database 212 of FIG. 2), and can include a set of actions that can be performed. In some examples, the set of actions correspond to the particular cultivar (e.g., the particular species of *Vitis*). In some examples, the actions can include, without limitation, pruning of particular sizes of branches (e.g., length, diameter), and pruning features depending on location (e.g., leaves that are within a threshold distance of the ground). It is contemplated that the set of actions can include any appropriate actions in view of the particular cultivar.

In some implementations, groups of actions can be randomly selected, and each can include one or more actions. In some examples, for each group of actions, the baseline multi-dimensional model can be modified (e.g., one or more features pruned from the model), and a corresponding modified string can be provided (e.g., the encoding that was determined for the baseline multi-dimensional model is adjusted to account for the pruning). In some implementations, the modified string is expanded over the iterations representing the predetermined period of time (e.g., time until harvest) using the modified rules. In this manner, for each group of actions, a predicted string can be provided, which represents the cultivar at harvest time, if the action(s) in the respective group of actions were to be performed. In some implementations, each of the predicted strings can be rendered into respective predicted multi-dimensional models (e.g., using a renderer).

In some implementations, a predicted harvest can be determined from each of the predicted multi-dimensional models. In this manner, each predicted harvest represents a respective yield of the cultivar at harvest time, if the action(s) in the respective group of actions were to be performed. In some implementations, the baseline harvest can be compared to each of the expected harvests, and respective impacts can be determined. In some examples, an impact represents an increase, or a decrease in yield as a result of a respective group of actions. In some examples, the group of actions associated with the best impact can be provided as a recommended set of actions. That is, the group of actions are provided as a recommended set of actions to take with respect to the cultivar at the current time (and/or date) in an effort to provide an improved yield at harvest time (e.g., improved with respect to a yield that would result taking no action).

In some implementations, the recommended set of actions can be conveyed textually, visually, and/or audibly to a user. For example, the one or more actions can be conveyed to the user on a computing device (e.g., the computing device 102 of FIG. 1).

Figure 5:
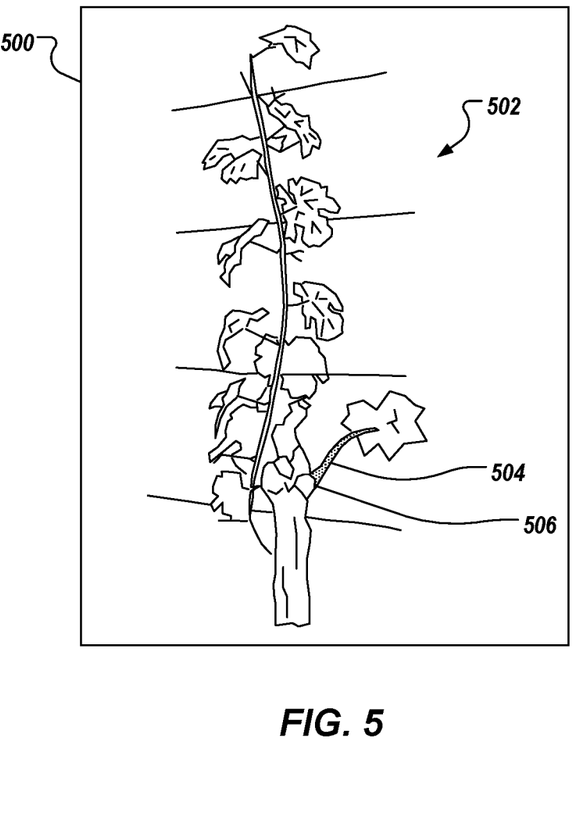
FIG. 5 depicts an example display displaying an example cultivar.

FIG. 5 depicts an example display 500 displaying an example cultivar 502. In some examples, the display 500 is provided on a computing device (e.g., the computing device 102) that a user (e.g., the user 120) is using to view the cultivar 502. In the depicted example, the cultivar 502 includes a branch 504 that has a visual treatment applied thereto. In the depicted example, the visual treatment is provided as shading. It is contemplated, however, that any appropriate treatment can be applied to visually distinguish the branch 504 from other features of the cultivar 502. In some implementations, the visual treatment corresponds to an action. For example, the visual treatment can correspond to pruning of the branch 504. That is, the visual treatment can indicate that the particular branch 504 is to be pruned. In some examples, the visual treatment can indicate an approximate location for pruning. In the example of FIG. 5, an approximate location 506 is depicted. Although a single action is represented in FIG. 5, it is contemplated that multiple actions can be conveyed to the user.

Figure 6:
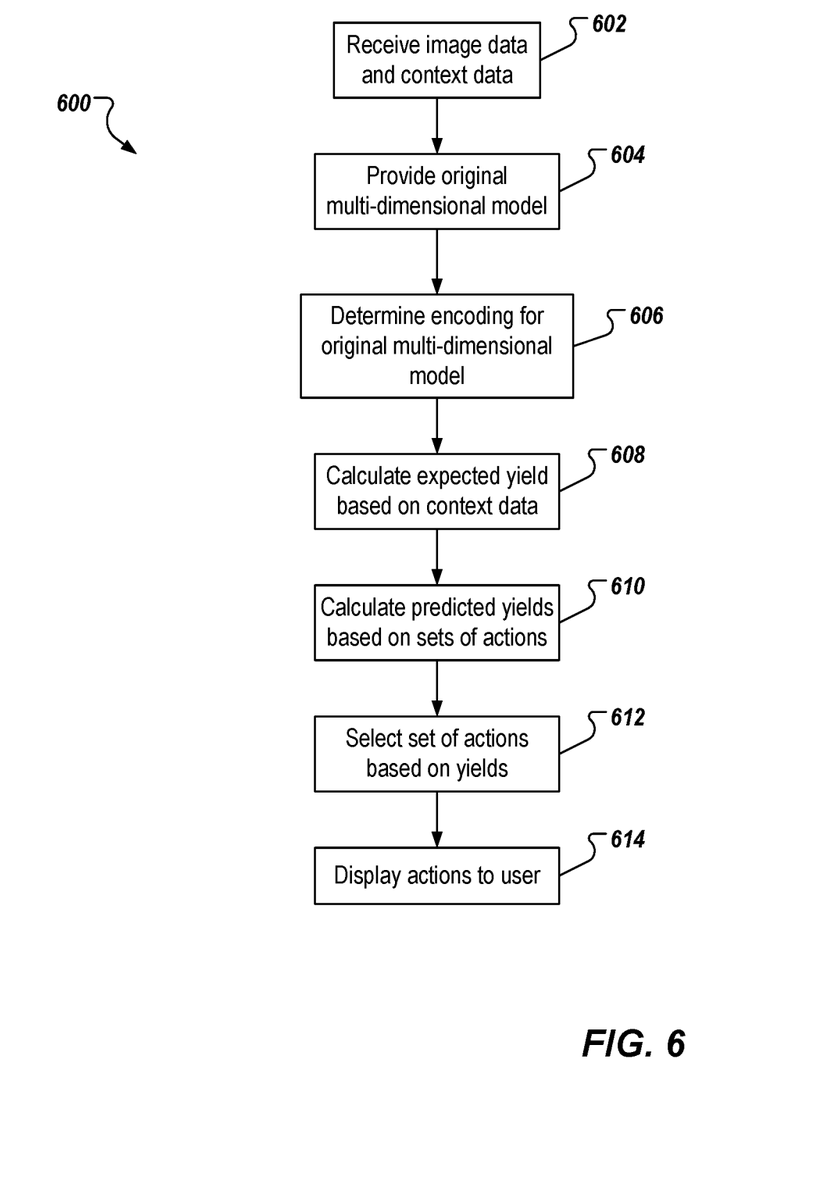
FIG. 6 depicts an example process that can be executed in implementations of the present disclosure.

FIG. 6 depicts an example process 600 that can be executed in implementations of the present disclosure. In some examples, the example process 600 is provided using one or more computer-executable programs executed by one or more computing devices (e.g., the back-end system 108 of FIG. 1).

Image data and context data are received (602). For example, and as described herein, the multi-dimensional modeling module 204 of FIG. 2 can receive image data, and context data as the input 214. In some examples, the image data includes stereoscopic images of a cultivar (e.g., plant, tree). In some examples, the context data includes, without limitation, location, terrain context, terrain shape, environmental data, climate data, and the like. An baseline multi-dimensional model is provided (604). For example, the multi-dimensional modeling module 204 generates a multi-dimensional model of the cultivar based on the image data, as described herein.

An encoding for the baseline multi-dimensional model is determined (606). For example, the encoding module 206 processes the baseline multi-dimensional model 206 to determine the encoding. As described in further detail herein, a plurality of target multi-dimensional models can be generated based on an alphabet, and a set of rules (e.g., in an L-system), each target multi-dimensional model having an associated string of symbols. A sufficiently similar target multi-dimensional model is selected, and the string of symbols is provided as the encoding for the baseline multi-dimensional model.

An expected yield is calculated based on the context data (608). For example, the status prediction module 208 can determine an expected yield (also referred to as baseline harvest) for the cultivar based on the encoding, and a set of modified rules, as described herein. The set of rules used to determine the encoding can be modified based on the context data as also described herein. Predicted yields are determined based on respective sets of actions (610). For example, one or more actions in each of multiple sets of actions can be applied to the baseline multi-dimensional model, resulting in respective modified strings (e.g., the encoding that was determined for the baseline multi-dimensional model is adjusted to account for the action(s) of a respective set of actions). In some implementations, the modified string is expanded over the iterations representing the predetermined period of time (e.g., time until harvest) using the modified rules. In this manner, for each group of actions, a predicted string can be provided, which represents the cultivar at harvest time, if the action(s) in the respective group of actions were to be performed. In some implementations, each of the predicted strings can be rendered into respective predicted multi-dimensional models (e.g., using a renderer). As described herein, a predicted harvest can be determined from each of the predicted multi-dimensional models. In this manner, each predicted harvest represents a respective yield of the cultivar at harvest time, if the action(s) in the respective group of actions were to be performed.

A set of actions is selected based on the predicted yields (612). For example, and as described herein, the baseline harvest can be compared to each of the expected harvests, and respective impacts can be determined, as described herein. In some examples, the group of actions associated with the best impact can be provided as the selected set of actions (recommended set of actions). The set of actions is conveyed to a user (614). For example, the set of actions can be included in the output 216 provided from the horticulture support platform 202 of FIG. 2. As described herein, the set of actions can be conveyed textually, visually, and/or audibly to a user. For example, the one or more actions can be conveyed to the user on a computing device, as described by way of example above with reference to FIG. 5.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executed by one or more processors, the method comprising:

providing a baseline multi-dimensional data model of a cultivar, the cultivar growing over time;

determining an encoding based on the baseline multi-dimensional data model, and a target multi-dimensional model, the encoding defining a string of symbols, and being based on an alphabet and a set of rules;

providing an expected multi-dimensional model based on the encoding, and a modified set of rules, the modified set of rules being based on the set of rules, the expected multi-dimensional model representing the cultivar after a period of time;

selecting a set of actions by determining multiple predicted multi-dimensional models for each set of actions in a plurality of sets of actions, and, for each predicted multi-dimensional model, providing a predicted yield that can be used to determine impact with respect an expected yield, the set of actions being selected based on a respective impact; and providing the set of actions as output for executing one or more actions of the set of actions on the cultivar.

2. The method of claim 1, further comprising receiving image data representative of stereoscopic images of the cultivar, wherein the baseline multi-dimensional data model is generated at least partially from the stereoscopic images.

3. The method of claim 1, wherein the alphabet and set of rules are provided as part of an L-system for providing strings to represent the cultivar.

4. The method of claim 1, wherein the modified set of rules are provided by adjusting a probability of at least one symbol of at least one rule based on the context data.

5. The method of claim 1, wherein the target multi-dimensional model is selected from a plurality of generated target multi-dimensional models based on respective similarity scores, each similarity score representing a degree of similarity between the baseline multi-dimensional model, and a respective target multi-dimensional model.

6. The method of claim 5, wherein the plurality of target multi-dimensional models are generated based on one of a recurrent neural network (RNN) approach, and an estimation of distribution algorithm (EDA) approach.

7. The method of claim 1, wherein the set of actions is output by displaying the cultivar on a display, and providing one or more treatments, each treatment representing an action in the set of actions.

8. The method of claim 1, wherein at least one action in the set of actions comprises pruning a feature of the cultivar.

9. The method of claim 8, wherein the feature comprises one or more of a leaf and a branch.

10. The method of claim 1, wherein each rule in the set of rules provides two or more expansion symbols for replacing symbols in previous iterations of the string of symbols.

11. The method of claim 1, further comprising receiving environmental sensor data, wherein the expected multi-dimensional model is provided based on the received environmental sensor data.

12. The method of claim 1, wherein each predicted multi-dimensional model is determined based on a set of actions applied to the expected multi-dimensional model.

13. A non-transitory computer-readable storage medium coupled to one or more processors and having instructions stored thereon which, when executed by the one or more processors, cause the one or more processors to perform operations comprising:

providing a baseline multi-dimensional data model of a cultivar, the cultivar growing over time;

determining an encoding based on the baseline multi-dimensional data model, and a target multi-dimensional model, the encoding defining a string of symbols, and being based on an alphabet and a set of rules;

providing an expected multi-dimensional model based on the encoding, and a modified set of rules, the modified set of rules being based on the set of rules, the expected multi-dimensional model representing the cultivar after a period of time;

selecting a set of actions by determining multiple predicted multi-dimensional models for each set of actions in a plurality of sets of actions, and, for each predicted multi-dimensional model, providing a predicted yield that can be used to determine impact with respect an expected yield, the set of actions being selected based on a respective impact; and providing the set of actions as output for executing one or more actions of the set of actions on the cultivar.

14. The computer-readable storage medium of claim 13, wherein operations further comprise receiving image data representative of stereoscopic images of the cultivar, wherein the baseline multi-dimensional data model is generated at least partially from the stereoscopic images.

15. The computer-readable storage medium of claim 13, wherein the alphabet and set of rules are provided as part of an L-system for providing strings to represent the cultivar.

16. The computer-readable storage medium of claim 13, wherein the modified set of rules are provided by adjusting a probability of at least one symbol of at least one rule based on the context data.

17. The computer-readable storage medium of claim 13, wherein the target multi-dimensional model is selected from a plurality of generated target multi-dimensional models based on respective similarity scores, each similarity score representing a degree of similarity between the baseline multi-dimensional model, and a respective target multi-dimensional model.

18. The computer-readable storage medium of claim 17, wherein the plurality of target multi-dimensional models are generated based on one of a recurrent neural network (RNN) approach, and an estimation of distribution algorithm (EDA) approach.

19. The computer-readable storage medium of claim 13, wherein the set of actions is output by displaying the cultivar on a display, and providing one or more treatments, each treatment representing an action in the set of actions.

20. The computer-readable storage medium of claim 13, wherein at least one action in the set of actions comprises pruning a feature of the cultivar.

21. The computer-readable storage medium of claim 20, wherein the feature comprises one or more of a leaf and a branch.

22. The computer-readable storage medium of claim 13, wherein each rule in the set of rules provides two or more expansion symbols for replacing symbols in previous iterations of the string of symbols.

23. The computer-readable storage medium of claim 13, wherein operations further comprise receiving environmental sensor data, wherein the expected multi-dimensional model is provided based on the received environmental sensor data.

24. The computer-readable storage medium of claim 13, wherein each predicted multi-dimensional model is determined based on a set of actions applied to the expected multi-dimensional model.

25. A system, comprising:
one or more processors; and a computer-readable storage device coupled to the one or more processors and having instructions stored thereon which, when executed by the one or more processors, cause the one or more processors to perform operations comprising:

providing a baseline multi-dimensional data model of a cultivar, the cultivar growing over time;

determining an encoding based on the baseline multi-dimensional data model, and a target multi-dimensional model, the encoding defining a string of symbols, and being based on an alphabet and a set of rules;

providing an expected multi-dimensional model based on the encoding, and a modified set of rules, the modified set of rules being based on the set of rules, the expected multi-dimensional model representing the cultivar after a period of time;

selecting a set of actions by determining multiple predicted multi-dimensional models for each set of actions in a plurality of sets of actions, and, for each predicted multi-dimensional model, providing a predicted yield that can be used to determine impact with respect an expected yield, the set of actions being selected based on a respective impact; and providing the set of actions as output for executing one or more actions of the set of actions on the cultivar.

26. The system of claim 25, wherein operations further comprise receiving image data representative of stereoscopic images of the cultivar, wherein the baseline multi-dimensional data model is generated at least partially from the stereoscopic images.

27. The system of claim 25, wherein the alphabet and set of rules are provided as part of an L-system for providing strings to represent the cultivar.

28. The system of claim 25, wherein the modified set of rules are provided by adjusting a probability of at least one symbol of at least one rule based on the context data.

29. The system of claim 25, wherein the target multi-dimensional model is selected from a plurality of generated target multi-dimensional models based on respective similarity scores, each similarity score representing a degree of similarity between the baseline multi-dimensional model, and a respective target multi-dimensional model.

30. The system medium of claim 29, wherein the plurality of target multi-dimensional models are generated based on one of a recurrent neural network (RNN) approach, and an estimation of distribution algorithm (EDA) approach.

31. The system of claim 25, wherein the set of actions is output by displaying the cultivar on a display, and providing one or more treatments, each treatment representing an action in the set of actions.

32. The system of claim 25, wherein at least one action in the set of actions comprises pruning a feature of the cultivar.

33. The system of claim 32, wherein the feature comprises one or more of a leaf and a branch.

34. The system of claim 25, wherein each rule in the set of rules provides two or more expansion symbols for replacing symbols in previous iterations of the string of symbols.

35. The system of claim 25, wherein operations further comprise receiving environmental sensor data, wherein the expected multi-dimensional model is provided based on the received environmental sensor data.

36. The system of claim 25, wherein each predicted multi-dimensional model is determined based on a set of actions applied to the expected multi-dimensional model.

* * * * *

UNITED STATES PATENT AND TRADEMARK OFFICE
CERTIFICATE OF CORRECTION

PATENT NO. : 10,638,668 B2
APPLICATION NO. : 16/117153
DATED : May 5, 2020
INVENTOR(S) : Christophe Dominique Marie Gueret, Freddy Lecue and Nicholas McCarthy Page 1 of 1

It is certified that error appears in the above-identified patent and that said Letters Patent is hereby corrected as shown below:

On the Title Page

Column 2 (Abstract), Line 14, delete "with respect an expected yield," and insert --with respect to an expected yield,--.

In the Claims

In Claim 1, Column 16, Line 16, delete "with respect an expected yield," and insert --with respect to an expected yield,--.

In Claim 13, Column 17, Line 12, delete "with respect an expected yield," and insert --with respect to an expected yield,--.

In Claim 25, Column 18, Line 22 (approx.), delete "with respect an expected yield," and insert --with respect to an expected yield,--.

In Claim 30, Column 18, Line 43 (approx.), after "system" delete "medium".

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*